Figure 1:
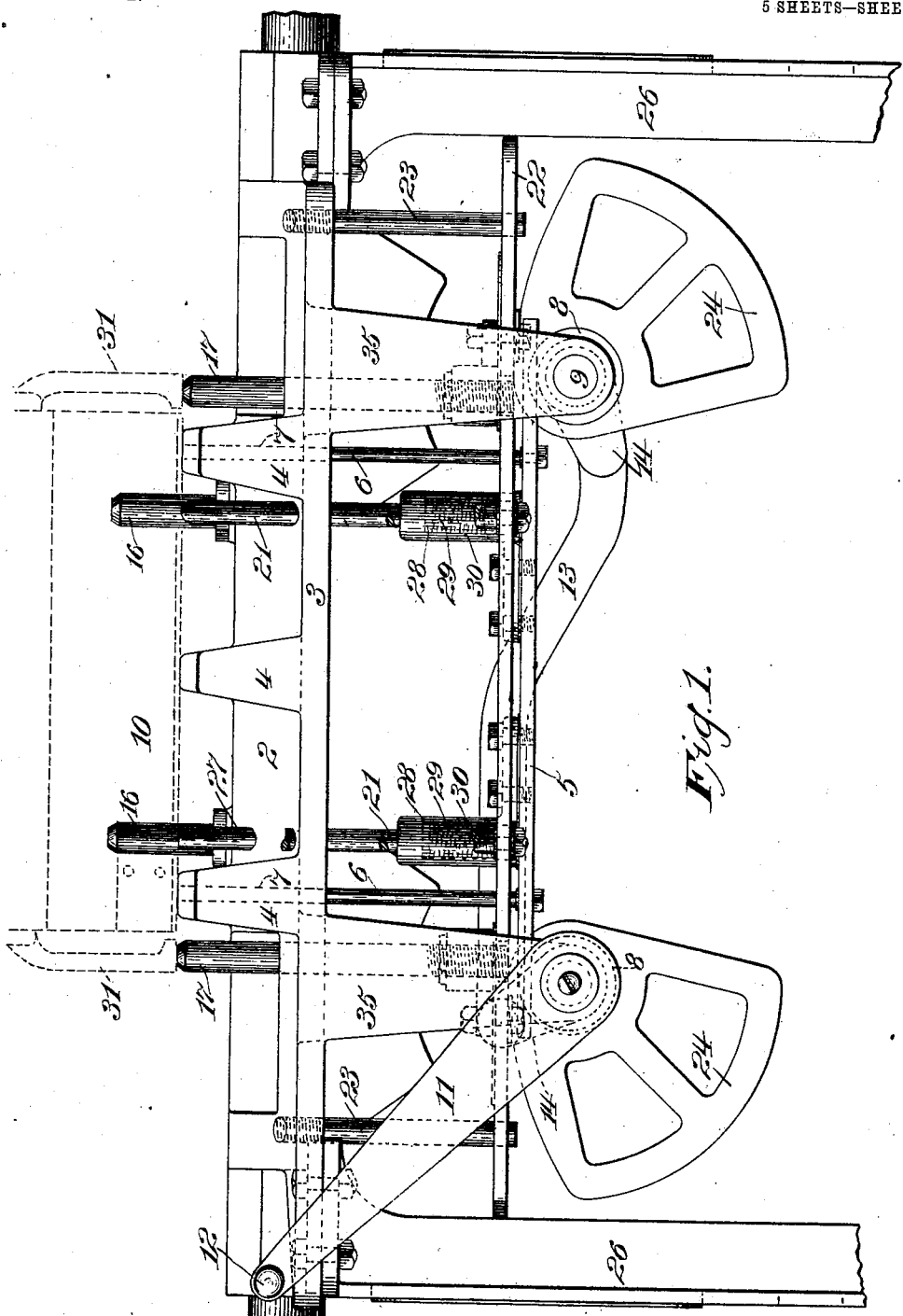

No. 762,365. PATENTED JUNE 14, 1904.
H. G. VOIGHT.
MOLDING MACHINE.
APPLICATION FILED DEC. 8, 1903.
NO MODEL. 5 SHEETS—SHEET 2.

No. 762,365. Patented June 14, 1904.

UNITED STATES PATENT OFFICE.

HENRY G. VOIGHT, OF NEW BRITAIN, CONNECTICUT.

MOLDING-MACHINE.

SPECIFICATION forming part of Letters Patent No. 762,365, dated June 14, 1904.

Application filed December 8, 1903. Serial No. 184,251. (No model.)

*To all whom it may concern:*

Be it known that I, HENRY G. VOIGHT, a citizen of the United States, residing in New Britain, in the county of Hartford and State of Connecticut, have invented certain new and useful Improvements in Molding-Machines, of which the following is a specification.

This invention relates to molding-machines designed more particularly for the production or making of a complete mold in a single operation during which the forming of the cope and nowel portions of the mold proceed concurrently.

The invention has for its object to furnish a molding-machine of the class specified having great accuracy and facility in its operation and is partially in the nature of an improvement on the invention described and claimed in United States Patent No. 741,569, granted to me October 13, 1903, to which reference may be had.

My present improvements relate more particularly to means to secure the nowel-section of the flask against moving out of place on the machine and to means to justify said nowel-section with the cope-section, or, in other words, to hold said nowel-section parallel to the cope-section of the mold during the process of separating one from the other for the removal of the pattern or patterns.

In the drawings which accompany and form a part of this specification there is disclosed an embodiment of the present invention.

Figure 2:
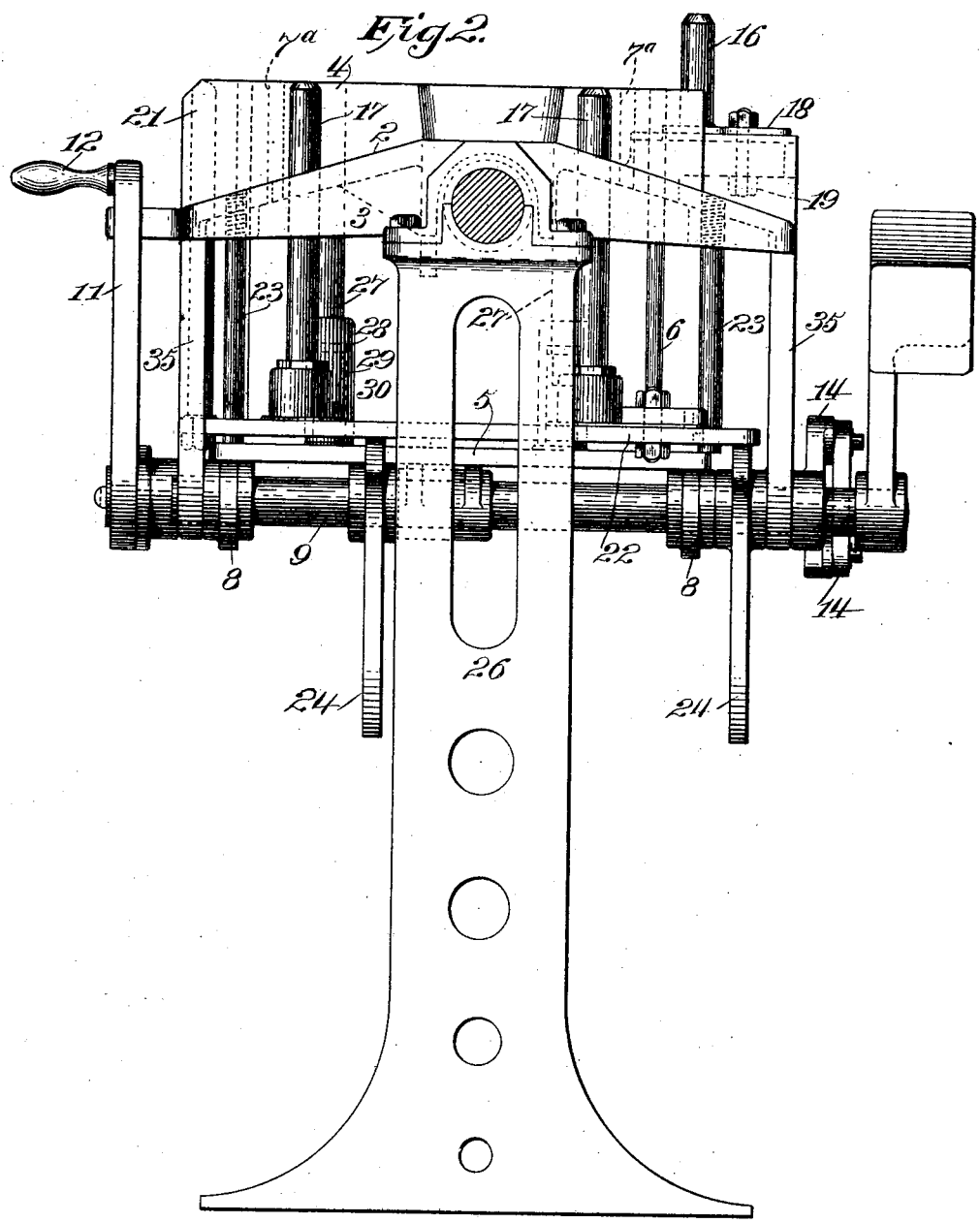
Figure 3:
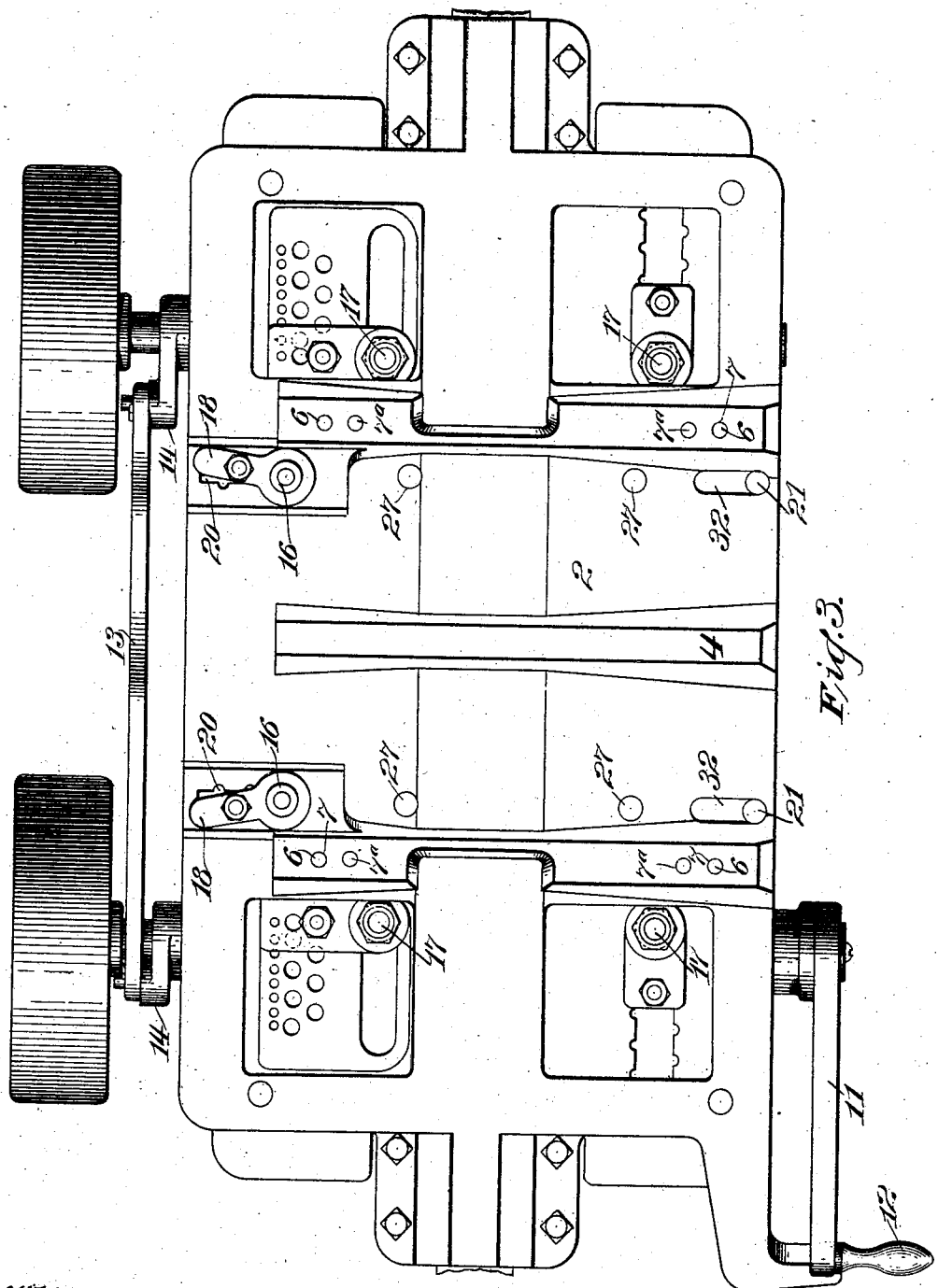
Figure 4:
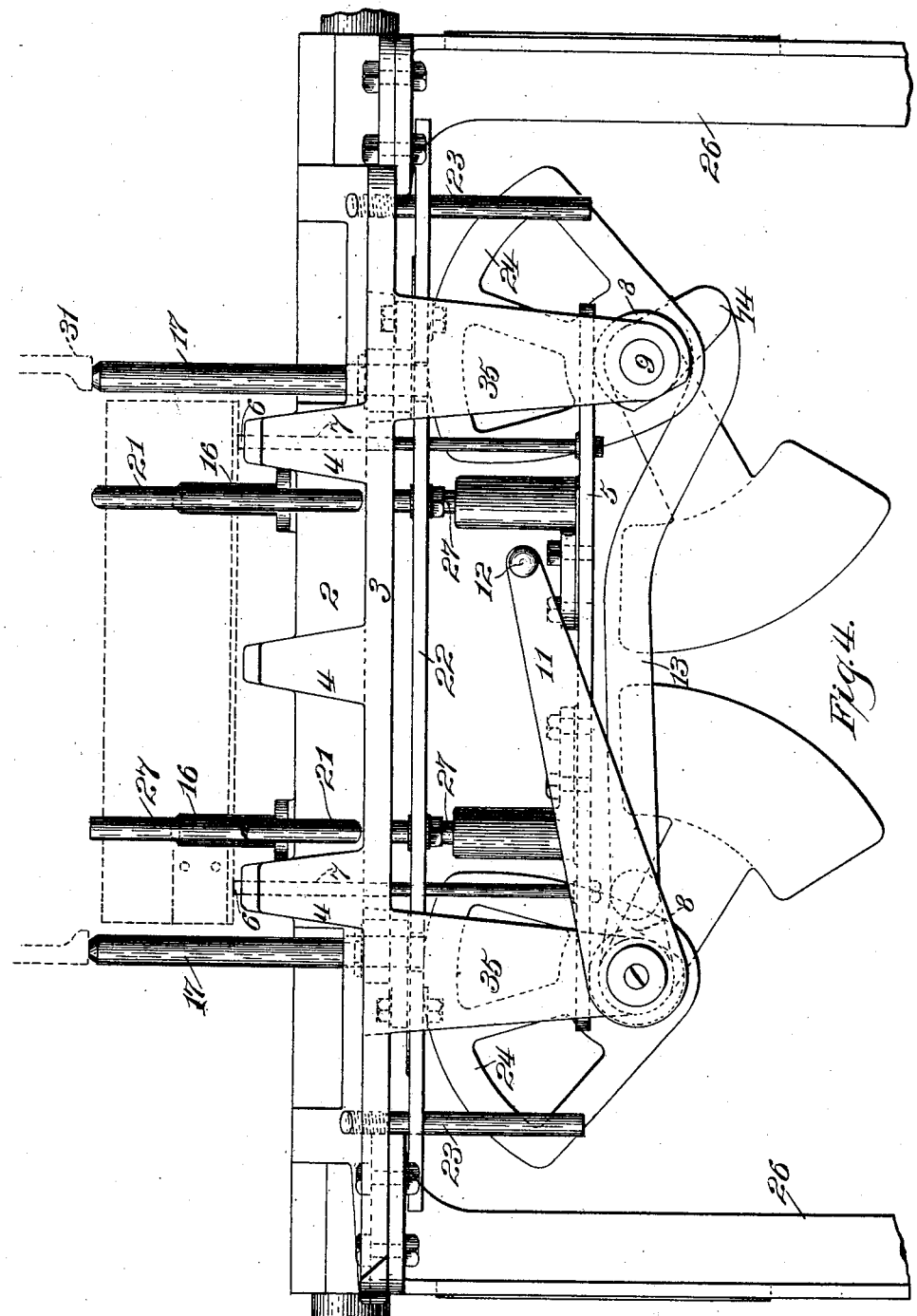
Figure 5:
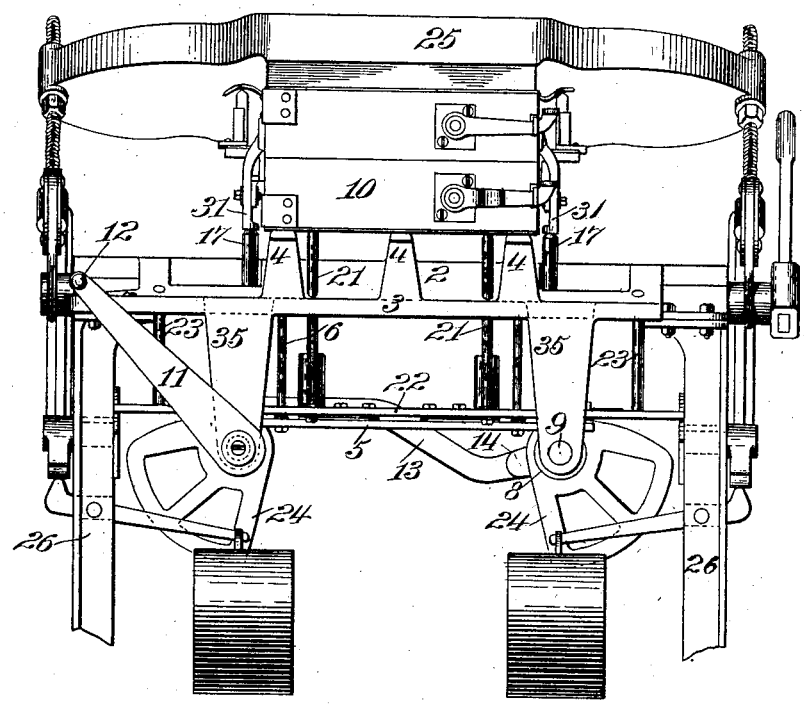
Figure 6:
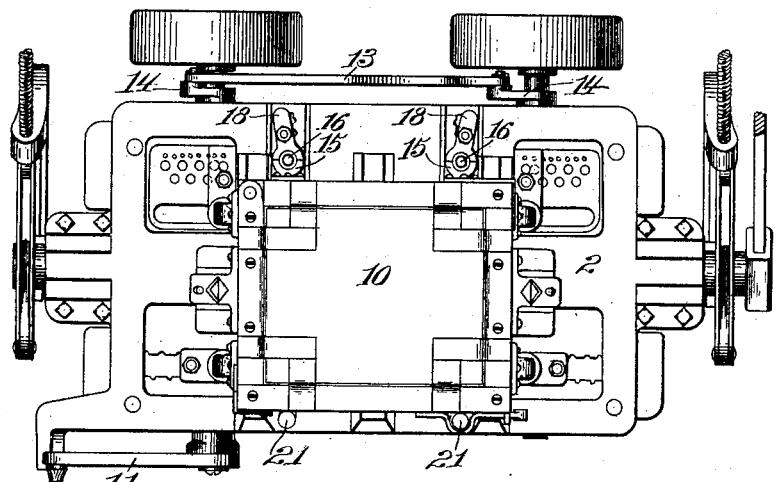

In the drawings, Figure 1 is a front elevation of so much of a molding-machine as will clearly illustrate my present improvements. Fig. 2 is a side elevation of the machine as represented in Fig. 1, the view being taken from the right-hand side thereof. Fig. 3 is a plan view of the machine. Fig. 4 is a view similar to Fig. 1, but with the moving parts at the completion of their various strokes instead of at their commencement, as in Fig. 1. Fig. 5 is a front elevation of a molding-machine complete except for a portion of the supporting-frames, showing the various parts in positions similar, respectively, to those shown in Fig. 1 and with a flask in position on said machine. Fig. 6 is a plan view of the machine shown in Fig. 5, but with the presser-bar removed.

Similar characters of reference designate corresponding parts in all the figures.

The machine will ordinarily comprise a suitable bed or platen, such as 2, for supporting the flask and which possesses adequate rigidity to resist the ramming or pressing action on the sand within the mold. I prefer to somewhat incline the upper face of the platen to cause any sand which may drop thereupon to roll down and off, thereby preventing the accumulation of sand upon the platen, which therefore acts as a sand-shedder. In the particular form and construction of the platen illustrated in the drawings the upper face thereof inclines downwardly from about the central longitudinal center line of the platen in opposite directions toward the front and toward the rear. While the present invention is, of course, not restricted to any particular details of construction for such platen, I may for convenience adopt those indicated in the drawings, in which a rigid platen-frame 3 is provided with cross-bars or ribs 4, upon which the flask rests. For holding the platen at a height proper for readily manipulating the machine, legs, such as 26, may be used, the same being rigidly secured to the platen in some suitable manner. The upper faces of said ribs 4 lie substantially in a common plane and serve to support the flask before and during the ramming or pressing of the sand therein. For the purpose of ramming or pressing the sand about the pattern in the flask some suitable form of pressure mechanism is used—such as shown, for instance, partially in Figs. 5 and 6 and more fully shown and described in my aforesaid United States Patent, No. 741,569, or in my United States Letters Patent No. 750,918, dated February 2, 1904. This mechanism, however, forms no part of my present invention, which has to do with the flask-sections only subsequent to the pressing operation and relates particularly to means to justify the flask-sections or to separate them in parallelism and means to secure the flask against moving out of place on the machine. The first of these means consists in a series of lifting devices, of which the first set is in the nature of lifting-pins 6, so disposed toward the front and toward the rear of the platen that they will be adjacent to the corners and under the front and rear edges of the flask 10 when said flask is properly located on the platen by means hereinafter described. To secure the simultaneous movement of all of the pins 6, they may be conveniently mounted upon a carrier, herein shown as a plate-like part 5, disposed below the platen 2 and constrained to a vertical movement by passing through guide-openings, such as 7, in the ribs 4 of the platen 2. To provide for flasks of various widths, other guide-openings, such as 7ª, may be made in said ribs and the pins 6 be adjusted to pass through such openings 7ª instead of through openings 7, as shown. Cam-like actuators are utilized for raising the carrier, the return of the lifted parts to their original position being effected by gravity. The actuating mechanism in the form thereof illustrated comprises a pair of actuators at each side of the machine, each pair including a cam-disk 8 at the front of the machine and a similar cam-disk 8 at the rear, both secured to a shaft 9, journaled in brackets 35, depending from the platen and bearing against the under face of the carrier 5 or fixtures thereof. One of the shafts 9 constitutes the actuating-shaft. It is provided with a crank-arm 11, carrying a handle 12. Both shafts 9 are compelled to move in unison, as the crank is turned by means of a link 13, pivotally connected at each end to an arm 14, extending from the shaft 9 adjacent thereto.

Mounted upon and carried by the carrier 5 are spring-supported means for retaining the nowel-board in place during the action of the lifting-pins 6. Said means preferably comprise sockets 30, one of which is disposed near each corner of a nowel-board, having cavities adapted to contain springs 29, the lower ends of plungers 27, and their heads 28. Said socket-cavities are contracted at their upper end to retain the plunger-heads 28 therein against the upward pressure of the springs 29. The strength of said springs is in the aggregate slightly in excess of that necessary to sustain the weight of said nowel-board, but much less than sufficient to sustain the weight of the entire nowel.

The proper predetermined position of the flask on the platen is attained by shoving the flask toward the back of the platen until the walls of V-shaped notches in flanges 15, extending from the flask, (see Fig. 6,) come into contact with respective centering-pins 16, located at the rear side of the platen. The flask will then be in position to be properly engaged by pins 6 for justifying and subsequently by the pins 17 for separating the cope-section from the nowel-section thereof. The centering-pins 16 are adjustably secured to the platen 2 by means of bolts 19, passing through openings in the feet 18 of said centering-pins and engaging with the bottom faces of slots 20, respectively, in said platen. Means for securing the flask in said proper predetermined position comprise in the preferred embodiment locking devices in the nature of posts 21, so disposed toward the front of the platen 2 and with their upper ends normally below the faces of ribs 4 as to be adjacent to the front wall of the flask when said flask is disposed with the walls of the V-shaped notches of flanges 15 in contact with their respective centering-pins 16. The platen 2 is provided with openings 32 to allow of the passage of posts 21 therethrough. To secure simultaneous movement of said posts 21, they may be conveniently mounted upon a carrier, herein shown as a plate-like part 22, disposed below the platen 2 and above the carrier 5. It is, however, immaterial to my improvement whether the carrier 22 be disposed above or below the carrier 5, so long as the coacting parts be disposed to perform their functions as shown and described. Said carrier 22 is constrained to a vertical movement by guide-pins, as 23, projecting downward from the platen and passing through guide-openings in the carrier. To differentiate the carrier 22 from the carrier 5, I designate the former the "secondary" carrier.

The actuating mechanism for the posts 21 in the form thereof illustrated comprises cam-disks 24, secured to the shafts 9, and whose turning in time with one another and with the other moving members of the machine is accomplished through the already-described means, consisting of shafts 9, link 13, and arms 14.

For lifting off the cope-section of the flask from the nowel-section lifting-pins, as 17, are provided adjustably mounted upon the secondary carrier 22. These pins when in their normal or idle position (see Fig. 1) have their upper faces in a plane substantially coincident with the plane of the faces of the ribs 4. Said lifting-pins are caused to act simultaneously and in proper time with the other moving parts of the machine by means of the secondary carrier 22, cam-disks 24, and other parts connected thereto, as hereinbefore described, and set forth more at length in my before-noted United States Patent No. 741,569.

A molding-machine such as hereinbefore described operates substantially in the following manner: The mold having been pressed and the presser-bar 25 having been thrown back, (see Fig. 5,) the operator grasping the handle 12 and rotating the crank 11 in a clockwise direction raises the carrier 5 and in close succession thereafter the carrier 22. The resultant raising of the flask from off the ribs 4 a slight distance through the engagement of the lifting-pins 6 with the lower edges of said flask (see Fig. 4) justifies the flask or eliminates from it any deviation it may have had from parallelism with said ribs 4 due to unequal pressing of the mold-board into the bottom thereof. At the same time the spring-supported plungers 27 raise the nowel-board, adjusting themselves by means of springs 29, respectively, to any deviation of said nowel-board from its normal plane, and thereby maintaining said board in constant relation to the nowel part of the flask. Following closely upon the commencement of the above-described operations the secondary carrier 22 rises through the instrumentality of the cam-disks 24. Thereupon the posts 21, mounted upon said secondary carrier 22, rise in front of the nowel-frame 10 of the flask and in contact with the front face thereof, thereby locking said nowel-frame against the centering-pins 16 and preventing any lateral movement of the flask. At the same time the pins 17 engage the end faces of suitably-disposed projections 31, extending from the cope part of the flask, and lift said cope part from off the nowel part. As said end faces of projections 31 lie in substantially one plane parallel to the plane of the flask-bottom and the flask-parting, said nowel part will be lifted off in parallelism to said parting. The pattern or patterns may then be withdrawn, the crank 11 turned in an anticlockwise direction back to its normal position, (see Fig. 1,) when the flask may be removed and another one substituted and the operation repeated.

Having thus described my invention, I claim—

1. In a molding-machine, in combination with means for separating the cope and nowel sections of a flask, means for justifying said cope and nowel sections with respect of said separating means prior to the actuation thereof.

2. In a molding-machine, in combination with means for separating the cope and nowel sections of a flask, means for justifying said cope and nowel sections prior to the separation of said cope and nowel sections.

3. In a molding-machine, in combination with a flask-supporting platen and means for separating the cope and nowel sections of a flask, means for justifying said cope and nowel sections, and means for locking said flask in a predetermined position.

4. In a molding-machine, in combination with a flask-supporting platen and means for separating the cope and nowel sections of a flask, means for justifying said cope and nowel sections, means for locating said flask in a predetermined position on the platen, and means for locking said flask in said predetermined position.

5. In a molding-machine, in combination with a flask-supporting platen and means for separating the cope and nowel sections of a flask, means for justifying said cope and nowel sections, adjustable means for locating said flask in a predetermined position on the platen, and adjustable means for locking said flask in said predetermined position.

6. In a molding-machine, in combination with a flask-supporting platen and means for separating the cope and the nowel sections of a flask, means for justifying said cope and nowel sections, means for locking said flask in a predetermined position on the platen and means to sustain the nowel-board in supporting position under said nowel-section, during the operation of the justifying means.

7. In a molding-machine, in combination with a flask-supporting platen and means for separating the cope and nowel sections of a flask, means comprising a carrier, lifting-pins shiftable with said carrier and which impinge against the edges of said nowel-section, for justifying said cope and nowel sections with respect to the separating means, means for locating said flask in a predetermined position on the platen, means for locking said flask in said predetermined position, means to sustain the nowel-board in constant supporting position under said nowel-section and mechanism for raising the carrier.

8. In a molding-machine, in combination with a flask-supporting platen and means for separating the cope and nowel sections of a flask, cam-operated means for justifying said cope and nowel sections with respect to the separating means, means for locating said flask in a predetermined position on said platen, cam-operated means for locking said flask in said predetermined position and spring-actuated means to sustain the nowel-board in supporting positions under said nowel-section during the operation of the justifying means.

9. In a molding-machine, in combination with a flask-supporting platen and means for separating the cope and nowel sections of a flask, means comprising a carrier, lifting-pins shiftable with said carrier and which impinge against the edges of said nowel-section, for justifying said cope and nowel sections with respect to the separating means, means for locating said flask in a predetermined position on the platen, cam-operated means for locking said flask in said predetermined position, and spring-actuated means shiftable with said carrier, and which impinge against the nowel-board to sustain said nowel-board in supporting position under said nowel-section during the operation of the lifting-pins, and mechanism for raising the carrier.

10. In a molding-machine, the combination of a platen, a secondary carrier, the cope-section of a flask having projections, lifting-pins shiftable with the secondary carrier, and which impinge against said projections of the cope-section as the secondary carrier moves upward, an adjustable flask-locator, a flask-position locker shiftable with said secondary carrier and which operates to lock said flask against said flask-locator as said secondary carrier moves upward, justifying means for the nowel-section of the flask, which means comprise a carrier, lifting-pins shiftable with said carrier and which impinge against the edges of said nowel-section, means to sustain the nowel-board in supporting position under said nowel-section during the operation of the justifying means, mechanism for raising the carrier and mechanism for raising the secondary carrier.

HENRY G. VOIGHT.

Witnesses:
ALBERT MORTON,
JAMES P. EUSTIS.